Patented Feb. 2, 1954

2,668,178

UNITED STATES PATENT OFFICE 2,668,178

HOMOSULFANILAMIDE SALTS OF BENZAL-THIOSEMICARBAZONES

Robert Behnisch and Fritz Mietzsch, Wuppertal-Elberfeld, and Hans Schmidt, Wuppertal-Vohwinkel, Germany, assignors to Schenley Industries, Inc., New York, N. Y., a corporation of Delaware No Drawing. Application January 14, 1952,
Serial No. 266,444

4 Claims. (Cl. 260—501)

This invention relates generally to chemotherapeutically active compositions of matter and, more particularly, it relates to sulfonamide salts of benzalthiosemicarbazones.

It is an object of the invention to provide compounds of the type above-mentioned having valuable therapeutic and physical properties. Further objects will be apparent from the following specification.

The objects of the invention are accomplished by producing salts from an alkaline-reacting aminoalkyl-benzenesulfonamide, such as those disclosed in U. S. Patent 2,288,531, by reacting it with an acid-reacting 1-benzalthiosemicarbazone having a substituent in the 4-position of the benzal moiety, selected from the group consisting of carboxy-, carboxymethyl-, and carboxyethenyl. By suitable selections of the salt-forming components, it is possible to prepare salts of high or low solubility, depending on the intended use. These salts of this invention can be produced by reacting the salt-forming components as free acid and free base in a suitable solvent, or by reacting a soluble salt of the acid component, such as its alkali- or ammonium salts with a soluble salt of the basic component, such as, for instance, the hydrochlorides, nitrates or methane sulfonates of the free base, in water, dilute alcohol or another suitable solvent.

Thiosemicarbazones of acid reaction suitable for use in preparing the novel compounds of this invention, are: benzalthiosemicarbazone-4-carboxylic acid, benzalthiosemicarbazone-3-carboxylic acid, benzalthiosemicarbazone-4-acetic acid (the thiosemicarbazone of 4-formyl-phenylacetic acid), and benzaldehydethiosemicarbazone-4-acrylic acid (the thiosemicarbazone of 4-formyl-cinnamic acid).

These thiosemicarbazone compounds are obtainable by condensing thiosemicarbazide with 3- or 4-formyl-benzoic acid, which may be obtained according to Löw, Annalen 231, 366, (1885), to obtain the corresponding benzalthiosemicarbazone-3 or 4-carboxylic acid; and by condensing thiosemicarbazide with benzaldehyde acrylic acid-(4), also described in Annalen, 231, 377 (1885), and J. Indian Chem. Soc. 24, 123, 383 and 413 (1917). The thiosemicarbazones of these benzaldehyde carboxylic acids are obtained in the usual manner by refluxing substantially equimolecular amounts of thiosemicarbazide and the selected acid in aqueous ethanol (1:1) reaction medium for about an hour, and recovering the thiosemicarbazone from the reaction mixture.

The thiosemicarbazone of 4-formyl-phenyl-acetic acid is obtained by refluxing equimolecular amounts of thiosemicarbazide and ethyl 4-formyl-phenylacetate, $OCH.C_6H_4CH_2.COOC_2H_5$, for about an hour in aqueous ethanol (1:1) and saponifying the thiosemicarbazone-ester. The ester is prepared from ethyl-4-cyano-phenylacetate, $NC.C_6H_4CH_2.COOC_2H_5$, by reducing it with stannous chloride, according to Stephen; it crystallizes in yellow crystals, having a melting point of 92° C. and a boiling point of 148° C. at 7 mm Hg pressure.

Sulfonamides of basic reaction, suitable for use in preparing the novel compounds of this invention, are: 4-aminomethyl-benzenesulfonamide, 4-aminomethyl-benzenesulfonic acid N-methyl-amide, 4 - aminomethyl-benzenesulfonic acid N-ethylamide, and 4-α-aminoethyl-benzenesulfonamide.

It will be obvious from the foregoing that the novel compounds of this invention are alkaline-reacting aminoalkyl-benzenesulfonamide salts of acid-reacting substituted benzalthiosemicarbazones, wherein the aminoalkyl-benzenesulfonamide moiety may be represented by the formula:

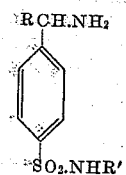

wherein R is either hydrogen or a methyl group and R' is hydrogen or a methyl or ethyl group; and wherein the substituted benzalthiosemicarbazone moiety may be represented by the formula:

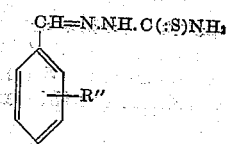

wherein R" is a substituent of the formula: $-CO_2H$, $-CH_2CO_2H$ or $-CH=CHCO_2H$.

The therapeutic efficacy of the thiosemicarbazonesulfonamide salts described herein exceeds that of the components when applied individually. With these new compounds, it is possible efficiently to combat mixed or composite types of infections, such as are frequently found in tuberculosis, and especially types of pneumonia that occur with tuberculosis of the lungs, which may be mitigated or favorably influenced by use of the new compositions.

This application is a continuation-in-part of our copending application Serial No. 106,744, filed July 25, 1949, now Patent No. 2,605,262.

The invention is further illustrated by the following examples, parts indicated being by weight:

Example 1

A solution of about 111.5 parts of benzaldehydethiosemicarbazone-4-carboxylic acid in 500 parts of aqueous ammonium hydroxide (1N) is reacted at 70° C. with a solution of 111.5 parts of the hydrochloric acid salt of 4-aminomethyl-benzenesulfonamide in 500 parts of water. The product salt, after being recrystallized, is obtained as light-yellow crystals which slowly decompose when heated to a temperature above 250° C. In an analogous manner, by reacting benzalthiosemicarbazone-4-acrylic acid with 4-$\alpha$-amino-ethyl-benzenesulfonamide, a salt is obtained in the form of faintly yellow crystals, which char when heated at a temperature above 260° C.

Example 2

About 15 parts of thiosemicarbazide and 24 parts of ethyl 4-formyl-phenylacetate of the formula:

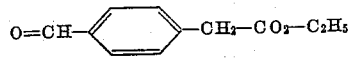

are refluxed for one hour in 250 cc. aqueous ethanol (1:1) to which 2 cc. glacial acetic acid had been added. On cooling the solution, the thiosemicarbazone of the formula:

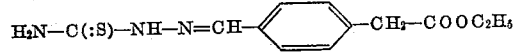

crystallizes in colorless crystals, having a melting point of 151° C.

About 37 parts of this thiosemicarbazone are dissolved in 200 parts of methanol and stirred for one hour at room temperature with 50 parts of a 30% aqueous sodium hydroxide solution, then the mixture is acidified by addition of hydrochloric acid. A thiosemicarbazone product is obtained as colorless crystals, having a melting point of 214° C. and being represented by the formula:

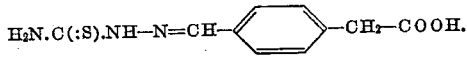

About 24 parts of this thiosemicarbazone are dissolved in 100 parts of aqueous ammonium hydroxide solution (1N) and 22 parts of the hydrochloride salt of 4-aminomethylbenzenesulfonamide, dissolved in 100 parts of water is added. Both solutions, before mixing are heated nearly to the boiling point. Yellow crystals precipitate on cooling, which melt at 218° C. with decomposition. The crystals are a 4-aminomethylbenzenesulfonamide salt of the thiosemicarbazone of the above formula.

It will be noticed that in each of the preceding examples the selected acid-reacting thiosemicarbazone is reacted with a selected sulfonamide of basic reaction to yield product salts of this invention. In like manner, by replacing any of these sulfonamides with an equimolecular proportion of the N-methyl sulfonamide or N-ethyl sulfonamide, further product salts of this invention are obtainable.

Having thus described the subject matter of this invention, what it is desired to secure by Letters Patent is:

1. Alkaline-reacting aminoalkyl-benzenesulfonamide salts of acid-reacting substituted benzalthiosemicarbazones wherein the aminoalkyl-benzenesulfonamide moiety is represented by the formula:

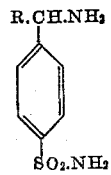

wherein R is a member of the group consisting of hydrogen and methyl and the acid-reacting substituted benzalthiosemicarbazone moiety is represented by the formula:

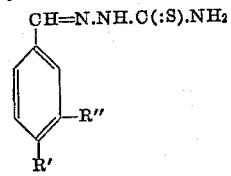

wherein one member of the group consisting of R' and R'' is hydrogen and the other is a member of the group consisting of:
—CO.OH, —CH$_2$CO.OH and —CH=CH.CO.OH 2. A chemotherapeutically active 4-aminomethylbenzenesulfonamide salt of benzalthiosemicarbazone-4-carboxylic acid.

3. A chemotherapeutically active 4-aminomethylbenzenesulfonamide salt of benzalthiosemicarbazone-4-acetic acid.

4. A chemotherapeutically active 4-$\alpha$-aminoethylbenzenesulfonamide salt of benzalthiosemicarbazone-4-acrylic acid.

ROBERT BEHNISCH.
FRITZ MIETZSCH.
HANS SCHMIDT.

References Cited in the file of this patent

UNITED STATES PATENTS

| Number | Name | Date |
|---|---|---|
| 2,545,962 | Lott et al. | Mar. 20, 1951 |

FOREIGN PATENTS

| Number | Country | Date |
|---|---|---|
| 76,218 | Germany | Oct. 28, 1943 |
| 270,691 | Switzerland | Dec. 1, 1950 |